(12) United States Patent
Limburg et al.

(10) Patent No.: US 6,241,386 B1
(45) Date of Patent: *Jun. 5, 2001

(54) DECAL WITH MULTIPLE CONCEALING FEATURES THAT SELECTIVELY DISPLAY OR CONCEAL TEMPERATURE SENSORS ACCORDING TO AMBIENT TEMPERATURE

(76) Inventors: Randy Martin Limburg, 31160 Electric Ave., Nuevo, CA (US) 92567; Paul Anthony Ridgway, 911 Ridgewood Dr., Julian, CA (US) 92036

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/221,643

(22) Filed: Dec. 28, 1998

(51) Int. Cl.⁷ .................................................... G01K 11/12
(52) U.S. Cl. ......................... 374/162; 374/141; 116/207; D10/57
(58) Field of Search ..................................... 374/162, 141, 374/161; 116/207, 216, 206; D20/11, 99; D10/57

(56) References Cited

U.S. PATENT DOCUMENTS

| D. 265,724 | 8/1982 | Khemka ................................ D10/57 |
| D. 281,147 | 10/1985 | Khemka ................................ D10/57 |
| 3,861,213 | 1/1975 | Parker .................................. 374/161 |
| 3,965,742 | 6/1976 | Parker .................................. 374/161 |
| 3,969,264 | 7/1976 | Davis .................................. 252/299.7 |

(List continued on next page.)

FOREIGN PATENT DOCUMENTS

| 2254621 | 12/1974 | (FR) . | |
| 2637406 | * 4/1990 | (FR) ..................................... 116/216 |
| 2199981 | 12/1988 | (GB) . | |
| 26236 | * 2/1983 | (JP) ..................................... 374/162 |
| 35121 | * 2/1991 | (JP) ..................................... 116/216 |
| 35122 | * 2/1991 | (JP) ..................................... 116/216 |
| 35123 | * 2/1991 | (JP) ..................................... 116/216 |

OTHER PUBLICATIONS

Brochure by Hallcrest entitled "Leading the Way in Temperature Indicating Technology", published prior to Dec. 28, 1998.

(List continued on next page.)

Primary Examiner—Diego Gutierrez
Assistant Examiner—Stanley J. Pruchnic, Jr.
(74) Attorney, Agent, or Firm—Dan Hubert & Assoc.

(57) ABSTRACT

A decal has multiple temperature sensors that individually appear within certain concealing features of the decal in accordance with different prescribed temperatures, otherwise blending into the concealing features and thereby disappearing into the design. The decal may depict an image of an animal, fish, flower, abstract form, or another design, such as a photograph, cartoon, sketch, or other representation. The image includes multiple separate concealing features, such as spots, fins, flower petals, abstract shapes, or other components of the decal's image. These features may have one color in common, or different concealing features may have different colors. The feature color(s) contrasts with one or more background colors in the design, which serve to visually separate the concealing features. The temperature sensors are scattered throughout the design in a visually pleasing manner. Importantly, the sensors are placed within the concealing features, where the non-activated color of each temperature sensor matches its surrounding concealing feature. Thus, non-activated sensors become completely camouflaged within their surrounding feature color(s). The temperature sensors comprise a formulation that reacts to changes in temperature by changing color, and may comprise a thermochromic liquid crystal (TLC) material, for instance. Each temperature sensor is activated by a different ambient temperature range.

21 Claims, 2 Drawing Sheets

U.S. PATENT DOCUMENTS

| | | | | |
|---|---|---|---|---|
| 4,019,368 | * | 4/1977 | Navato | 374/162 |
| 4,022,706 | | 5/1977 | Davis | 252/299.7 |
| 4,198,920 | | 4/1980 | Russell | 116/202 |
| 4,301,023 | | 11/1981 | Shuberth et al. | 252/299.7 |
| 4,459,046 | * | 7/1984 | Spirg | 374/162 |
| 4,468,137 | | 8/1984 | Hilsum | 374/160 |
| 4,888,219 | * | 12/1989 | Barnes | 374/162 |
| 4,891,250 | * | 1/1990 | Weibe et al. | 374/152 |
| 5,304,003 | | 4/1994 | Winninger | 374/150 |
| 5,997,964 | * | 12/1999 | Klima, Jr. | 374/162 |

OTHER PUBLICATIONS

Brochure by THERMOGRAPHICS, entitled "Liquid Crystal Products 1999", published prior to Dec. 28, 1998.

Brochure by Hallcrest entitled "Handbook of Thermochromic Liquid Crystal Technology", dated 1991.

* cited by examiner

DECAL WITH MULTIPLE CONCEALING FEATURES THAT SELECTIVELY DISPLAY OR CONCEAL TEMPERATURE SENSORS ACCORDING TO AMBIENT TEMPERATURE

BACKGROUND OF THE INVENTION

1. Field of the Invention

The present invention generally relates to thermometers with components that react to changes in temperature by changing color, such as thermochromic liquid crystals (TLCs). More particularly, the invention concerns an apparatus or article of manufacture comprising a multi-colored decal such as an animal, flower, fish, or other design with spots or other features that individually reveal or display a message according to the ambient temperature. According to the decal's current temperature, an appropriate one of the temperature sensors, normally camouflaged within the features of the decal, is activated and thus becomes visible.

2. Description of the Related Art

Temperature sensing devices come in a variety of forms, with various underlying scientific principles. One recent type of thermometer uses TLCs, usually constructed in a planar shape. TLCs react to changes in temperature by changing color. These materials are made of twisted molecular structures comprising optically active mixtures of organic chemicals. TLCs include cholesteric compositions, chiral nematic formulations, and combinations of the two.

TLCs show colors by selectively reflecting incident white light. "Temperature-sensitive" mixtures in thin films reflect bright, almost pure colors. They turn from colorless (black, against a black background) to red at a given temperature, and pass through the other colors of the visible spectrum in sequence as temperature increases. This progression includes orange, yellow, green, blue, and violet. At an even higher temperature, the crystals turn colorless (black) again.

In contrast to temperature-sensitive mixtures, "temperature-insensitive" formulations reflect just a single color below a given transition temperature, changing to colorless (black) above this temperature. These formulations are sometimes called "shear-sensitive" or "clearing point" mixtures. TLC formulations have also been developed that provide a bandpass feature, reflecting a single color within a prescribed temperature range, otherwise changing to colorless (black).

TLCs have been implemented in a variety of forms. One of the most prevalent examples is a temperature strip made by placing numerous TLC rectangles end to end. The rectangles are arranged so that, as the ambient temperature changes from lowest to highest readable temperature, the rectangles are individually illuminated sequentially from one end of the strip to the other. This is done by using bandpass-type TLC rectangles with sequentially increasing activating temperatures. One example is the reversible temperature sensor, part A5321, manufactured by Hallcrest, Inc. of Glenview Ill. With this particular part, the TLC in each rectangle is shaped into numbers defining the corresponding temperature sensed by that rectangle, such as "74".

TLC materials are used in many different product configurations. For example, some temperature strips are attached to a background border printed with certain textual information. For example, the border may include evenly marked numerical increments of temperature, a temperature scale (e.g., Celsius) that contrasts with that shown on the temperature strip, etc. With other products, the border material includes a cartoon drawing, ruler, or other non-textual information. In some cases, the printed border design provides a decorative function unrelated to the temperature strip; in other configurations, the printed border provides data with some relation to the temperature strip.

Although some of the thermometers discussed above enjoy widespread commercial success today, the present inventors have sought to improve the utility and operation of known thermometers.

SUMMARY OF THE INVENTION

Broadly, the present invention concerns a decal with multiple temperature sensors that individually appear within certain concealing features of the decal in accordance with different prescribed temperatures, otherwise blending into the concealing features and thereby disappearing into the design. The decal may depict an image of an animal, fish, flower, abstract form, or another design, such as a photograph, cartoon, sketch, or other representation. The image includes multiple separate concealing features, such as spots, fins, flower petals, abstract shapes, or other components of the decal's image. These features may have one color in common, or different concealing features may have different colors. The feature color(s) contrasts with one or more background colors in the design, which serve to visually separate the concealing features. The temperature sensors are scattered throughout the design in a visually pleasing manner. Importantly, the sensors are placed within the concealing features, where the non-activated color of each temperature sensor matches its surrounding concealing feature. Thus, non-activated sensors become camouflaged within their surrounding feature color(s).

The temperature sensors comprise a formulation that reacts to changes in temperature by changing color, and may comprise a thermochromic liquid crystal (TLC) material, for instance. Each temperature sensor is activated by a different ambient temperature range. As an example, each activated sensor may display a number representative of the corresponding temperature range, such as 78° F. Instead of numbers, the sensors may display other themes such as various colors, words, graphics, alphanumerics, etc. As a particular example, sensors may indicate various comfort or safety zones by displaying messages such as "too warm", "just right", or "too cold". Thus, according to the decal's current temperature, an appropriate one of the temperature sensors is activated, causing it alone to arise from its otherwise hidden position in one of the image's concealing features.

Each temperature sensor may be located apart from any others, i.e., no two sensors in the same concealing feature. Alternatively, temperature sensors may be arranged in different groups, where each group of sensors resides in the same concealing feature. Additionally, the invention also includes arrangements with a combination of grouped and solo sensor distribution. In many cases, it may be desirable to provide a design where the image and the temperature sensors are flat. However, surfaces with some desired contour may be used if required.

Accordingly, as discussed above, one aspect of the invention is an apparatus or article of manufacture, embodied in a decal with multiple concealing features that selectively display or conceal temperature sensors, according to the ambient temperature. Another aspect of the invention involves a method for manufacturing such a thermometer.

The invention affords its users with a number of distinct advantages. For example, many users will find these thermometers to be significantly more attractive and interesting than the often sterile, mathematical TLC strips of the past. Furthermore, animal owners seeking to provide a more authentic animal habitat for their pets will find the present thermometer decal to be more natural, and less visually distracting. Users may find particular benefit for this thermometer in aquariums, terrariums, solariums, and other microhabitats. Furthermore, other applications may include shower doors, windows, and other safety, environmental, or ornamental applications.

The invention also provides a number of other advantages and benefits, which should be apparent from the following description of the invention.

DETAILED DESCRIPTION

The nature, objects, and advantages of the invention will become more apparent to those skilled in the art after considering the following detailed description in connection with the accompanying drawings. As mentioned above, the invention concerns a multi-colored decal such as an animal, fish, flower, abstract form, or other design with various "concealing features", such as spots, fins, abstract shapes, flower petals, and the like. Located within some or all of these concealing features are temperature sensors, such as thermochromic liquid crystals (TLCs), that react to changes in temperature by changing color. Each temperature sensor reacts to a different activating temperature. The color of each sensor when not activated matches its surrounding concealing feature, thereby camouflaging the sensor. According to the decal's current temperature, an appropriate one of the temperature sensors is activated, causing it to become visible and become visually distinct from the surrounding concealing features that otherwise camouflage the sensor.

Hardware Construction

Figure 1:
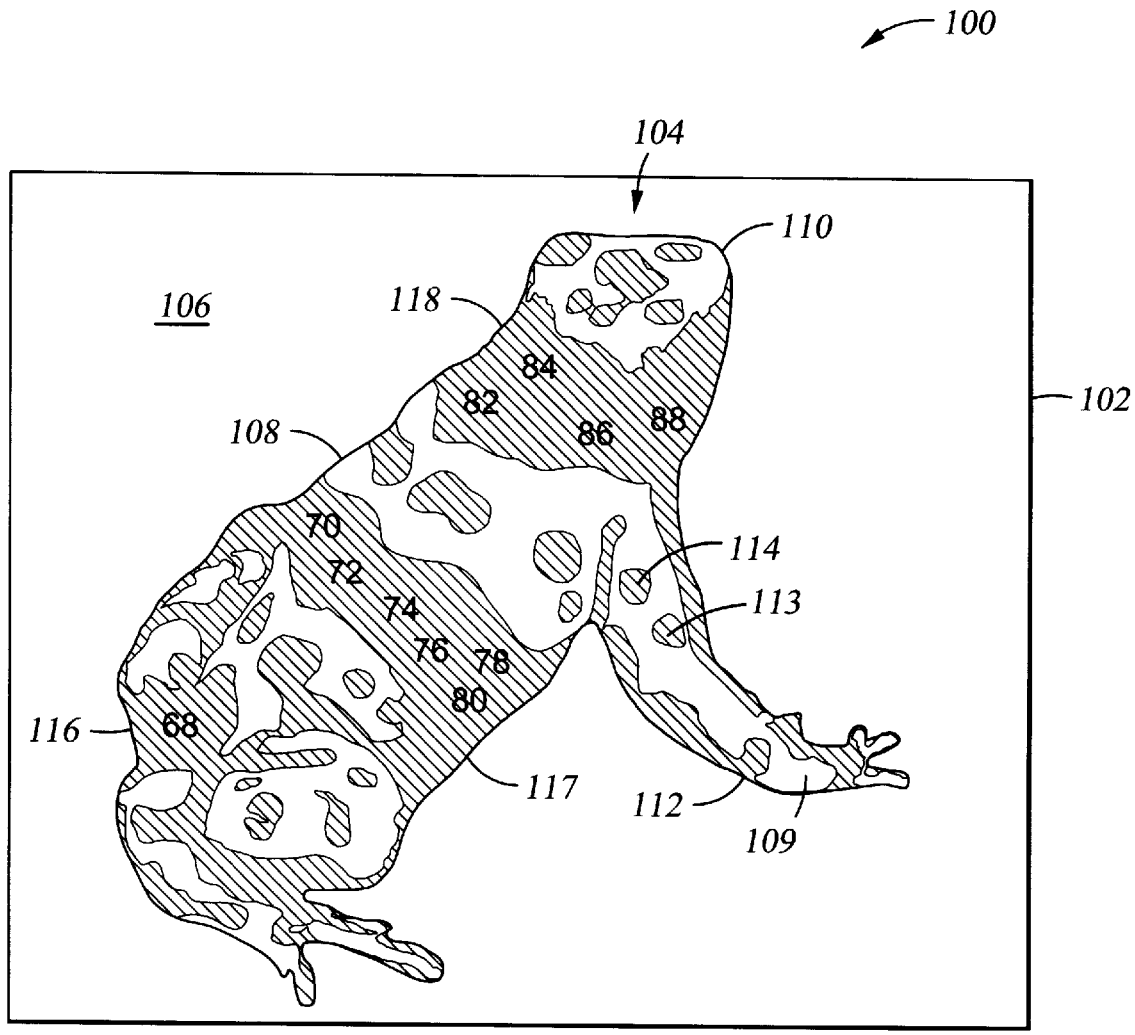
FIG. 1 is a block diagram of the hardware construction of a thermometer decal according to the invention.

FIG. 1 depicts one aspect of the invention, which concerns a decal 100 bearing the image 104 of an animal. Although the decal 100 may be constructed of various arrangements and different components, FIG. 1 illustrates an example of one specific implementation, which depicts a frog. Instead of animals, the decal 100 may be constructed to depict another form, such as a fish, flower, abstract design, etc. The decal 100 is comprised of a film with various "concealing features", and temperature sensors scattered among these features. In the illustrated example, the decal 100 includes a primary film 102 bearing an image 104 of an animal. In this example, the primary film 102 comprises a material that is thin, flexible, and water insoluble. Other desirable characteristics of this material include ready bonding to one or more types of ink and adhesive, and color stability despite exposure to light. As one example, the film 102 may be made of a polyester material.

In the illustrated example, the film 102 is transparent. As an option, the film 102 may exhibit a "see-through" region 106 after construction of the image 104. The image 104 includes many different regions exhibiting two or more colors, which together form an image of an animal. As an example, the image may be a photograph, cartoon, sketch, or other representation.

The image 104 includes one or more background regions and multiple concealing features. The background regions may exhibit one or more colors. The concealing features have one or more colors, each of which is distinct from the colors of the background region(s), thereby setting the concealing features apart from the background regions. In this example of FIG. 1, the image 104 includes various lightly colored regions (such as the regions 108–110), which provide the background regions. In the example of the illustrated frog image, the background regions (e.g., 108–110) may be light green. The image 104 also includes various darker regions (such as the regions 112–114), which provide the concealing features. In the example of the illustrated frog image, the concealing features (e.g., 112–114) may be dark green or black. In this example, the image 104 includes two colors: one background color and one feature color. The feature color and the background color are visually distinct to a human viewer. For this purpose, they may exhibit different shades of the same hue (e.g., light green and dark green), different hues (e.g., red and green), different patterns, etc. In each of the foregoing examples, the concealing features and background regions exhibit different "colors" as defined in this application.

The image 104 may be applied to a top or bottom surface of the film 102. For example, the image 104 as viewed in FIG. 1 may be applied over the film 102 (bonded to top surface), or the image 104 may be applied beneath the film 102 as viewed in FIG. 1 (bonded to bottom surface). The various colored regions of the image 104 may constitute ink, dye, additional layers of film, or other suitable regions having the desired colors.

The decal 100 also includes multiple temperature sensors, scattered throughout the design in a visually pleasing manner. The sensors may be located individually, such as the sensor 116, and/or in sensor groups, such as the respective sensor groups 117 and 118. Importantly, each non-activated sensor is camouflaged within its respective concealing feature. This may be achieved in a number of different ways.

For example, each sensor may be layered with a base coat that matches the color of its concealing feature. In the case of black concealing features, a suitable base coat may be a matching black base coat #8202DA, commercially available from Hallcrest, Inc. of Glenview Ill. In the foregoing embodiment, the sensors may be transparent when non-activated, permitting the color of the underlying base coat to show through, and thereby concealing the temperature sensor within the surrounding concealing feature whose color matches the base coat.

In a different embodiment, the sensors may omit the base coat or use a white or transparent base coat, where each sensors when not activated exhibits the color of its respective concealing feature. In this embodiment, non-activated sensors become camouflaged within the animal's background color by virtue of their non-activated colors. Relatedly, activated sensors appear from their concealing features by exhibiting a color that contrasts with the concealing feature.

Each sensor comprises a temperature sensitive substance, such as a TLC. For instance, the sensors may be manufactured from cholesteric formulations, chiral nematic formulations, a combination of cholesteric and chiral nematic components, etc. As a particular example, one type of sensor formulation is liquid crystal coat #8202DB, commercially available from Hallcrest, Inc. of Glenview, Ill. Coat #8202DB is a temperature-sensitive, water-based coating, containing a microencapsulated cholesteric liquid crystal mixture. In one embodiment, each temperature sensor exhibits bandpass temperature sensitivity. In this example, the temperature sensor is activated only in response to a prescribed temperature range, such as 71.5°–72.4°; above or below this range, the temperature sensor is not activated.

Each sensor has a different temperature sensitivity. In other words, each temperature sensor is activated by a different ambient temperature range. As shown in FIG. 1, each activated sensor displays a number representing a corresponding temperature range. For instance, the sensor 116 displays "68" when it senses an ambient temperature near 68° F. Sensors in the group 117 indicate temperatures of 70°, 72°, 74°, 76°, 78°, and 80° F. Although all temperature sensors are shown simultaneously in FIG. 1, this is for ease of explanation only; in practice, only one temperature sensor (or several sensors, if their activating temperature ranges slightly overlap) would actually appear at a time. Namely, because each sensor's base coat (or non-activated color) matches the background color, the sensors disappear into the features of the animal image 104. However, according to the decal's current temperature, an appropriate one of the temperature sensors is activated, causing it alone to arise from its otherwise hidden position in the animal image.

As an alternative to the numeric temperature indications, the sensors may display alphabetic messages, such messages representing comfort or safety zones, such as "too warm", "just right", or "tool cold". Other alternatives include sensors displaying text-free colors or graphics, a combination of alphabetic and numeric descriptors, or another suitable scheme.

In many cases, it may be desirable to provide a design where the image and the temperature sensors are both flat. However, surfaces with some contour may be used if desired. Also, if desired, the image 104 may be cut from the film 102 to eliminate any surrounding film such as the see-through region 106. Furthermore, a transparent adhesive and peel-off backing (not shown) may be applied to the top or bottom surface of the decal 100, enabling a user to mount the decal 100 to an appropriate surface, such as a wall or a terrarium, aquarium, window, hamster cage, solarium, shower door, window, etc. Instead of adhesive, the decal may use static electricity, a natural affinity of the film material to non-porous surfaces such as glass or plexiglass, or another bonding technique.

As shown above, the animal image 104 and its camouflaged temperature sensors provide a visually pleasing means to monitor the ambient temperature in a pet's environment.

Manufacturing Process

Figure 2:
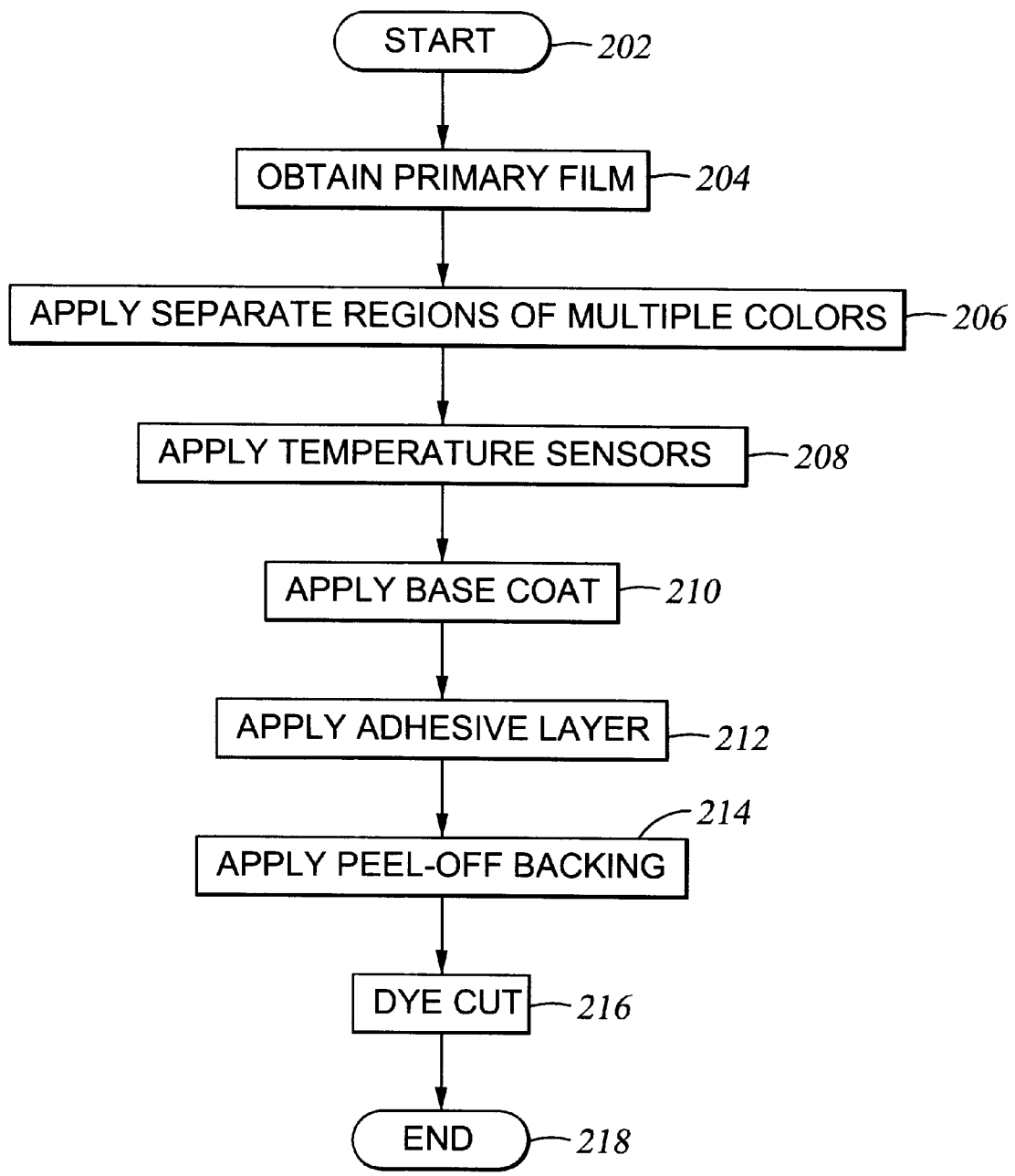
FIG. 2 is a flowchart of an operational sequence for manufacturing a thermometer decal, in accordance with the invention.

In addition to the structure described above, a different aspect of the invention concerns a method for manufacturing a multi-colored decal with disappearing temperature sensors. FIG. 2 shows a sequence of method steps 200 to illustrate one example of such a method. For ease of explanation, but without any limitation intended, the example of FIG. 2 is described in the context of the particular animal decal 100 of FIG. 1.

The steps 200 are initiated in step 202. First, the primary film 102 is obtained in step 204. Next, in step 206, various regions of multiple different colors are applied beneath the film 102 (as viewed into the page of FIG. 1). Some of these regions include, for example, regions 108–110 of the background color and regions 112–114 of the concealing feature color. In the example of FIG. 1, the regions are green (108–110) and black (112–114) areas defining the frog image 104. The green constitutes a background color, with the black providing the concealing feature color. In the present example, the colored regions are applied to the rear surface of the primary film 102, where the image 104 is intended to be viewed through the clear film 102. These regions may be applied by various processes, such as spraying, dipping, lithography, silk screening, floating, or another suitable printing technique. If desired, this process may involve selectively masking various regions of the film 102 to help define regions of the proper shape. For greater efficiency, all regions of a given color may be applied together in single step. After application of a region or color (as desired), the ink may be dried by air, cured with ultraviolet light, infrared heat, or treated by another technique to secure the coloring.

After step 206, step 208 applies the temperature sensors beneath the primary film 102 (as viewed into the page of FIG. 1). The temperature sensitive material may be applied, for example, by brushing, roller-coating, silk screening, or spraying using hand or automated equipment. The temperature sensors are applied so as to be surrounded by, adjacent to, or otherwise contiguous with concealing-feature-colored regions. This ensures that the inactive sensors disappear and blend into their respective concealing features.

Using similar techniques, the base coat is applied atop the temperature sensitive formulation in step 210 (i.e., below the temperature sensors as viewed into the page of FIG. 1). The base coat may be the color of the concealing feature, a different color, or clear; furthermore, the base coat may even be omitted entirely as discussed above. Following step 210, an adhesive layer is applied (step 212). The adhesive may be applied beneath the layering of the primary film 102, colored regions, temperature sensitive layers, and base coat (as viewed into the page of FIG. 1). Alternatively, the adhesive layer may be applied directly over the film 102 (above the film 102 as viewed into the page of FIG. 1), opposite the colored regions, temperature sensitive layer, and base coat. Alternatively, application of the adhesive may be omitted if the decal is to be mounted using static electricity, natural affinity of the film 102 or other materials in the decal for non-porous surfaces, etc.

If the adhesive layer is applied, a peel-off backing is applied atop the adhesive layer in step 214. Optionally, the completed film 102 may be die cut to provide a finished decal in the shape of the image 104. After step 216, the process 200 is completed, as shown by step 218.

Ordinarily skilled artisans (having the benefit of this disclosure) will recognize various possible adjustments to the steps 200, without departing from the scope of this invention. As one example, the steps 200 may be changed in various ways. For instance, temperature sensitive formulation may be applied before or after the dye of the colored regions. Furthermore, the colored regions and temperature sensitive formulations may be applied to the front of the film 102 instead of the rear, or to a combination of front and rear surfaces. Thus, the base coat may be applied over or beneath the temperature sensitive formulation, depending upon whether the image 104 is to be viewed through the film 102 or from the side opposite the film 102.

Other Embodiments

While the foregoing disclosure shows a number of illustrative embodiments of the invention, it will be apparent to those skilled in the art that various changes and modifications can be made herein without departing from the scope of the invention as defined by the appended claims. For example, although animal-shaped designs have been used as convenient and tangible examples, ordinarily skilled artisans (having the benefit of this disclosure) will recognize that the present invention may be implemented with a tremendous variety of other different shapes and images. Furthermore, although elements of the invention may be described or claimed in the singular, the plural is contemplated unless limitation to the singular is explicitly stated.

What is claimed is:

1. An article of manufacture comprising a thermometer decal, comprising:

a primary film bearing an image with a multiplicity of fixed-color, substantially black features distributed across the image, the features being separated by intervening regions contrasting in color with the features;

a multiplicity of temperature sensors having irregular vertical and horizontal distribution across the image where each temperature sensor resides within a respective one of the features;

where each sensor is activated in response to a different temperature range, each sensor when not activated substantially matching its respective feature, and each sensor when activated causing a different text message to appear by displaying a color distinct from its respective feature.

2. The article of claim 1, all of the features being of the same color.

3. The article of claim 1, said distribution being such that at least one of the occupied features only contain a single temperature sensor.

4. The article of claim 1, a plurality of the features being free from any sensors within them.

5. The article of claim 1, each sensor when activated displaying a different color than other sensors when activated.

6. The article of claim 1, the sensors' text messages comprising at least one of the following: numerals, alphabet letters.

7. The article of claim 1, the temperature sensors comprising thermochromic liquid crystal materials of different temperature sensitivities.

8. The article of claim 1, further comprising a substantially clear secondary film surrounding the first film and being substantially planar thereto.

9. The article of claim 1, each temperature sensor further including a base coat having a color that substantially matches the color of the feature containing that sensor.

10. The article of claim 9, where each sensor when not activated is substantially transparent.

11. A thermometer apparatus, comprising:

a first substantially flat surface depicting an animal image, the animal including a multiplicity of fixed-color concealing shapes scattered across the animal image and separated by intervening regions contrasting in color with the shapes; and multiple substantially flat temperature sensors having irregular vertical and horizontal spacings across the animal image where each sensor occupies one of the concealing shapes, each sensor being activated when experiencing a corresponding temperature within a different predefined range, each sensor when not activated substantially matching its concealing shape, and each sensor when activated causing a different text message to appear by displaying a color distinct from its concealing shape.

12. A method of manufacturing a thermometer decal, comprising:

obtaining a substantially flat primary film having a front surface and an opposing rear surface;

applying to the rear surface multiple fixed-color, substantially black concealing regions and one or more intervening background regions, where the concealing regions and the background regions are of different colors; and applying to the rear surface multiple substantially planar temperature sensors having irregular vertical and horizontal distribution across the primary film, where multiple of the temperature sensors are applied so as to reside within a respective one of the concealing regions, each sensor being activated in response to sensing a different temperature range, each sensor when not activated matching the color of its respective concealing region, each sensor when activated causing a different text message to appear by displaying a color distinct from its respective concealing region.

13. The method of claim 12, further comprising:

applying to each temperature sensor a base coat having a color that substantially matches the color of the concealing feature containing that sensor.

14. The method of claim 12, further comprising:

applying an adhesive layer atop at least a portion of one or more of the following:

the concealing regions, the background regions, the temperature sensors, and the front surface.

15. The method of claim 14, further comprising:

applying a peel-off backing to the adhesive layer.

16. The method of claim 12, further comprising:

cutting the decal into a predefined shape.

17. The method of claim 12, at least one of the occupied features only containing a single temperature sensor.

18. The method of claim 12, the temperature sensors comprising thermochromic inks.

19. The method of claim 18, the thermochromic inks comprising thermochromic liquid crystals.

20. The method of claim 12, the primary film being substantially transparent.

21. A thermometer decal, comprising an animal image with a plurality of black regions separated by one or more non-black colors, where multiple of the regions include one or more corresponding temperature sensors and the sensors are scattered in irregular vertical and horizontal distribution across the image, each sensor activated responsive to a different temperature range, each sensor disappearing into the corresponding region when not activated, and when activated arising from the corresponding region to present a number representing one or more temperatures of the temperature range of that sensor.

* * * * *